United States Patent Office
3,292,452
Patented Dec. 20, 1966

3,292,452
COMBINED HAND BRAKE FOR VEHICLES
Carl Johan Nordström and John Fritiof Rönnhult, Sodertalje, Sweden, assignors to Aktiebolaget Scania-Vabis, Sodertalje, Sweden, a corporation of Sweden
Original application July 5, 1962, Ser. No. 207,614, now Patent No. 3,185,264, dated May 25, 1965. Divided and this application Mar. 1, 1965, Ser. No. 436,189
Claims priority, application Sweden, July 4, 1961, 6,956
13 Claims. (Cl. 74—625)

This application is a division of S.N. 207,614, filed July 5, 1962, now Patent No. 3,185,264.

This invention relates to a vehicle hand brake for effecting required brake power either by means of a servo device, that is a so-called hand brake amplifier, or by manually operating a mechanical multi-stroke device.

Mechanical hand brakes for vehicles are known in a great number of various types, some of them having their operation based on a multi-stroke device.

Although such hand brakes are capable of producing sufficient brake power by moving the hand brake lever forth and back, the brake power applied will vary considerably due to the fact that various persons will have a different opinion of the required degree of pulling the hand brake. Furthermore, in practice mechanical brakes are not satisfactory with respect to the requirement that they should be readily operable in the traffic, since the operation of them takes too much time and requires too much attention of the driver of the vehicle. Accordingly, such brake mechanisms cannot be considered to fulfill a hand brake function which shall be safe with respect to the increasing traffic of our days.

Therefore, vehicles for heavy duty have to an increasing extent been equipped with hand brakes associated with servo devices. Such kinds of amplifiers operating with some kind of pressure fluid are either of the so-called single-chamber type or of the two-chamber type. In the first mentioned type, when the brake is released atmospheric pressure prevails on both sides of a piston enclosed in a cylinder and adapted to act upon the braking mechanism via a piston rod. On applying a brake of this type fluid under pressure is supplied to one side of the piston. In contrast thereto, in the two-chamber type both sides of the piston are loaded by the fluid under pressure in the released condition of the brake, and when braking, one of the chambers of the cylinder is emptied so that atmospheric pressure prevails on the corresponding side of the piston, whereas the other side of the piston is still acted upon by the fluid under pressure.

As compared with the single-chamber type the two-chamber type offers the advantage that fluid under pressure immediately is available at the piston. Consequently, on starting the braking operation conduits and brake chambers need not be filled which would result in a delay in starting the braking.

It is known in prior hand brakes provided with amplifiers to place the servo device in close proximity to the locking mechanism of the hand brake lever in order to obtain a common and compact unit.

Such hand brake units have proved to be useful in some respects but unfortunately they are dependent on the servo device for obtaining the required brake power. Hence their reliability cannot be considered sufficient. This is especially true when the hand brake is intended to be used also as an emergency brake.

Hitherto, there has been no other choice than to select either of the two above mentioned alternatives and at the same time to make all efforts to reduce the disadvantages of the respective device. This has often resulted in complicated and expensive mechanisms which in spite of the efforts made have not proved sufficiently effective.

In connection with the hand brakes under consideration, for example so-called combined hand brakes of known construction should be mentioned. In such combined hand brakes a mechanical braking device is effective in a first stage for controlling the wheel brakes, and when the required power increases a hydraulic servo device is put into operation in a succeeding stage. Such built-in mechanical braking devices may be used as parking brakes but under difficult circumstances they may not meet the requirements for an emergency brake.

The object of the present invention is substantially to create a combination of the two above mentioned types of hand brakes for obtaining a unit which mainly has the advantages but eliminates the disadvantages of the above alternative forms of hand brakes in order to ensure a safe brake function for all occasions.

The combination intended is however not obtained simply by employing what is previously known in the prior art but in accordance with the invention the combined hand brake is in all respects adapted for the double braking function with a brake mechanism which forms a simple and effective unit which also should be competitive in price.

This and other objects are attained with a combined hand brake device which in accordance with the invention is characterized in that a servo device, a so-called hand brake amplifier, and a mechanical multi-stroke device which includes a lever mechanism and locking device common for both kinds of braking functions, are built together on a frame in close association with the hand brake lever.

In order to enable the above combination it is necessary that the servo device and its piston mechanism is adapted for the purpose under consideration, and to obtain this the device according to the invention is characterized in that a control rod connected with the hand brake lever and operating a valve device for the amplifier, is provided with a piston or similar element which in dependency of the pressure prevailing in the valve housing of the servo device is balanced in such a manner that before applying the brake a manual force is required which is proportional to the desired tension in the link system.

The invention is further characterized in that the multi-stroke device of the hand brake function includes a change gear which enables both full setting of the brake by means of manual force only as well as a stepwise release of the brake when the pressure fluid system for any reason would fail. The last mentioned operation should be possible independent of whether the hand brake has been set manually or by means of the servo device.

The invention will be disclosed more in detail with reference to the accompanying drawings showing by way of example a preferred embodiment of the invention.

Figure 1:
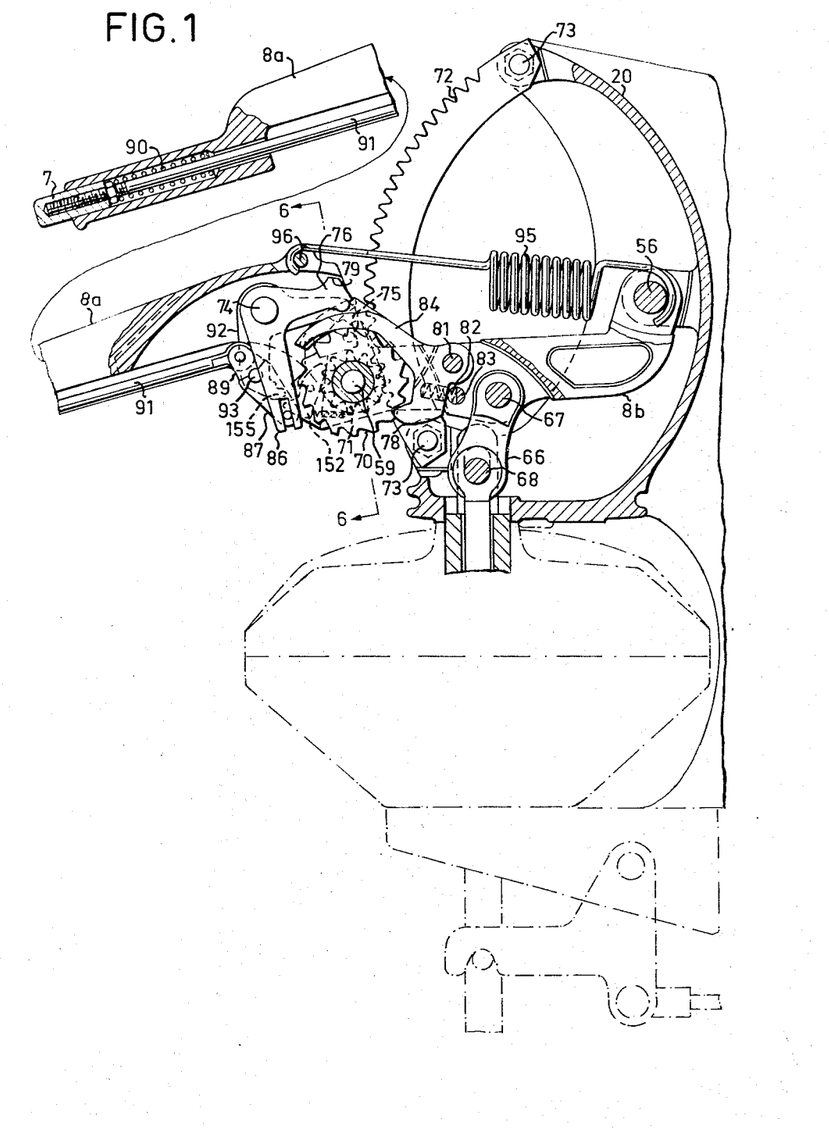
FIG. 1 is a longitudinal section of the combined brake shown in FIG. 5 and illustrate a brake lever associated closely with an amplifier and a mechanical multi-stroke device.

The air pressure operated amplifier shown in FIG. 1 is mounted on a frame 20 which also supports a pivotally mounted hand brake 8a, 8b and two locking segments 72 secured by means of two bolts 73.

The brake lever comprises two main parts 8a, 8b which are pivotally mounted in relation to each other and which include a locking device cooperating with the locking segments 72 upon locking the brake lever in various positions.

The inner lever part 8b is pivotally mounted on a pivot pin 56 secured to the frame 20, and the outer lever part 8a has at its free end a handle in which a push button 7 is displaceably journalled to act on a rod 91 which cooperates with the locking device and is displaceable under the influence of a compression spring 90.

By manual operation of the push rod 91 via the push button 7 the locking members of the locking device are released, for example upon releasing the hand brake. This function will be disclosed more in detail in the following.

For mounting the pressure air amplifier in close proximity of the locking device of the brake lever, the inner lever part 8b is via two links 66 and two pivot pins 67 and 68 connected with a control rod 39 (FIG. 2) associated with a valve device described below. The pivot pin 68 connecting the link 66 with the control rod has a lost motion connection with the upper part 44b of a bellows rod 44a, 44b. The pivot pin 68 is namely projecting into oblong holes in the upper part 44b of the bellows rod which part is formed as a fork. Due to this lost motion the control rod is to a certain extent movable axially in relation to the bellows rod 44a, 44b. The control rod 39 is guided by a central bore in the upper part 44b of the bellows rod and by a compression spring 38 which is initially loaded in a direction corresponding to releasing the brake.

Figure 2:
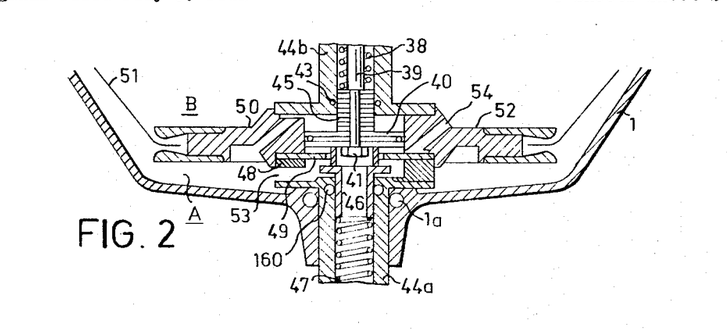
FIGS. 2, 3 and 4 show diagrammatically sectional views of a pressure air servo motor according to the invention and in three different operating positions.

The device according to the invention is provided with an air pressure controlled servo device of the two-chamber type, the two chambers being separated by a diaphragm like bellows 51 mounted between the two halves 1, 2 forming a casing. This bellows is at its outer periphery sealingly secured between the halves 1, 2 of the casing and its hollow central portion is sealingly secured to a valve casing 52 which is rigidly secured between the upper and lower part of the bellows rod 44a, 44b. The bellows 51 thus forms together with the casing half 1 a chamber A and together with the casing half 2 a chamber B. The bellows rod 44a, 44b is displaceably mounted in a centrally located bore in the two halves 1, 2 of the casing, and the two parts of the bellows rod are sealed by means of sealing rings 1a, 2a in the guide holes of the two halves 1, 2.

The lower part 44a is pivotally connected with one arm of a bell crank journalled on the frame, the other arm of said crank being pivotally connected with a link system for the wheel brakes (FIG. 1).

Figure 3:
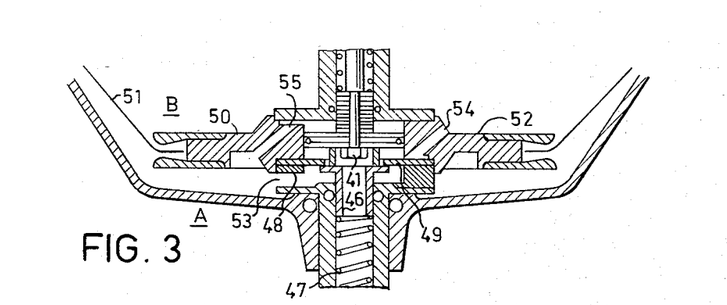
Figure 4:
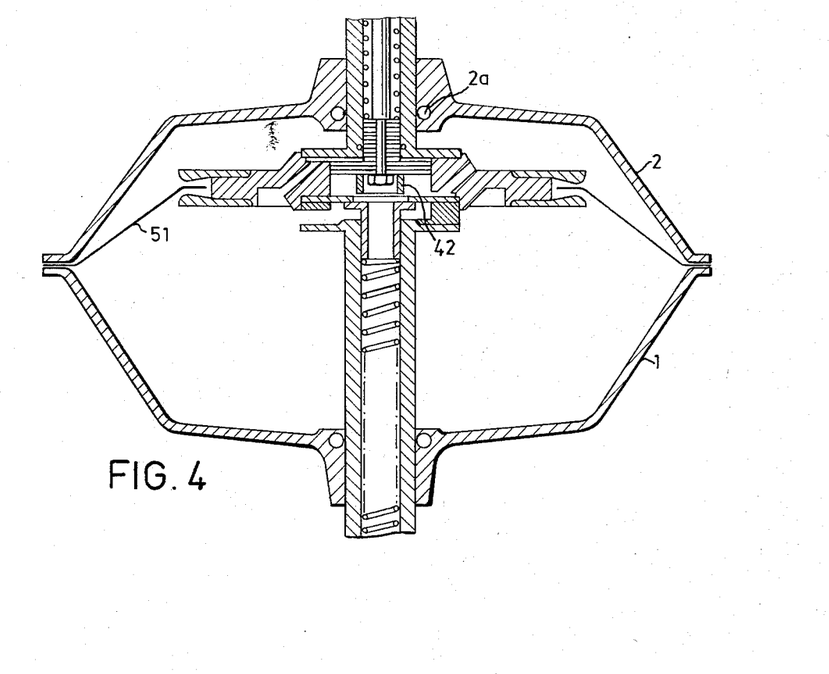

By axial displacement of the control rod 39 upon the influence of movements of the hand brake lever 8a, 8b, a valve device located in the valve casing 52 is actuated. This valve device is provided for controlling the supply and outlet of air under pressure for the chamber B so that it is possible to vary the volume of the two chambers as illustrated in FIGS. 2, 3 and 4 and to obtain a braking effect at the wheel brakes proportional to the force applied to the hand brake lever 8. The last mentioned result is of specific importance if the hand brake be used as an emergency brake.

To this end the control rod 39 is at its inner end provided with a control piston 40 which is secured by means of a nut 41. The piston 40 has at its forward end a cylindrical collar forming an annular valve seat 42 (best seen in FIG. 3). A sealing ring 43 disposed in a groove in the bore on the upper bellows part 44b forms a seal against the hub 45 of the piston 40 so that air under pressure cannot flow along the control rod 39.

For cooperation with the control piston 40 and its valve seat 42 there is an axially movable tubular valve 46 disposed in a central bore in the lower bellows part 44a and loaded by means of a compression spring 47. The valve 46 is sealed by means of a sealing ring 160 disposed in a groove in the lower bellows part 44a, and in its upper part the valve 46 is provided with a flange, the plane end surface of which is in sealing engagement with the valve seat 42 when the brake is released.

When the brake is applied the movement of the valve 46 in the direction of the pressure from the spring 47 is limited by a washer 48 which forms a valve seat 49 coaxial with the valve seat 42. The washer 48 is secured to a flange 50 disposed in the valve casing 50 and is rigidly connected with the bellows rod 44a, 44b. This flange is sealingly connected to the bellows 51. The diameter of the valve 46 is so great that the valve will cover the two valve seats 42 and 49.

That side of the washer 48 facing the valve 46 is provided with one or more channels 53 between the valve casing 52 and the chamber A, and on the opposite side of the washer there are similar channels 54 connecting the valve casing 52 with the chamber B. Furthermore, between the chamber A and the rear side of the piston there are channels 55 which lead any possible over-pressure in the chamber A to the rear side of the control piston 40 in order to balance practically completely the pressure on the front side of the piston.

The object of the central hole in the valve 46 is, upon braking, to permit air under pressure in the chamber B to escape through the bore of the lower bellows part 44a and from the same through an outlet opening (not shown) to the surrounding atmosphere.

The mode of operation of the valve device in FIGS. 2, 3 and 4 is as follows.

When the hand brake is released (FIG. 2) the bellows rod 44a, 44b and the valve device and the bellows 51 are in their respective lower positions and the bellows 51 is then located in the cup shaped half 1 of the casing so that the chamber A is considerably smaller than the chamber B. The chamber A is in continuous communication with an air pressure source (not shown) which in turn is fed by a compressor. Within the chamber A there is accordingly the same over-pressure as in said pressure source. Since the valve 46 is open when the brakes are released, the chamber B is through the channels 54 and 53 in open communication with the chamber A and thus also with the pressure source. Accordingly, there is a full working pressure on both sides of the bellows 51 and consequently there will be no force on the lower bellows part 44a.

When the braking operation is started the control rod 39 pulls the piston along with it so that the valve 46 comes into contact with the valve seat 49, thereby interrupting the connection between the chambers A and B (FIG. 3). The two chambers have then both the same over-pressure, but the chamber B is cut off from communication with the chamber A which still is in direct communication with the air pressure source. In this position the valve 46 still seals against the valve seat 42 of the control piston.

Upon continued movement of the control rod 39 in the same direction the valve seat 42 of the control piston comes out of contact with the now stationary valve 46, and air escapes to the surrounding atmosphere. The bellows 51 will then be pressed upwardly by the pressure in the chamber A and be moved into the upper casing half 2 as shown in FIG. 4. The chamber A which is subjected to over-pressure is now considerably greater than the chamber B in which only atmospheric pressure is prevailing.

Simultaneously when the air is flowing out of the chamber B the pressure on the front side of the control piston will fall, whereas its rear side is still subjected to over-pressure. As a result the pressure difference acting on the control piston tends again to interrupt the connection between the valve seat 42 and the valve 46 and to open the communication between the valve 46 and the valve seat 49. According as the required tensile force on the lower bellows rod 44a increases it is therefore necessary to pull harder on the hand brake lever in order to prevent refilling of the chamber B and consequent reduction of the tractive force of the power amplifier.

The mode of operation when releasing the hand brake is particularly characteristic for the device according to the invention and will therefore be described more in detail at a later part of this specification.

If for some reason or other the air pressure system of the vehicle would become inoperative the brake should be able to be applied by manual operation only. In case of heavy vehicles the required braking effort would, however, be so great that manual force would not be sufficient for complete application of the brake by means of a simple brake lever.

However, in the device according to the invention the hand brake is combined with a change gear which when needed may be employed to replace the servo function when failing.

According to the embodiment shown in FIG. 1 the hand brake is composed of two main parts 8a, 8b pivotable relative to each other. Those portions of the lever parts pivotally connected are fork shaped and provided to project into each other, the prongs 58 of the lever part 8a enclosing the prongs 57 of the lever part 8b. Through holes in all of the prongs extends a pivot pin 59 which is fixed axially and has locking rings on its projecting ends. This pivot pin supports between the prongs 57 a movably journalled locking wheel 70. This is formed integral with two pinions 71 which are in mesh with the toothed segments 72.

Figures 5, 6, 7:
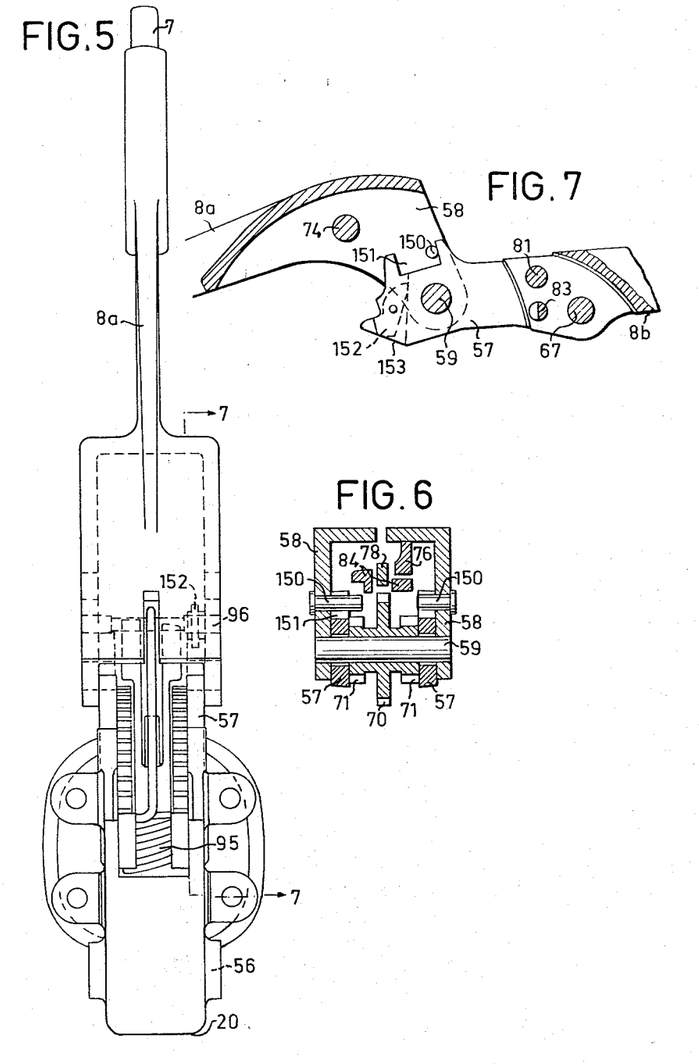
FIG. 5 is a plan view of the brake lever device according to FIG. 1.
FIG. 6 is a section taken on the line 6—6 in FIG. 1 with certain details omitted.
FIG. 7 is a vertical section on the line 7—7 in FIG. 5 taken through the brake lever shown in FIG. 1 and comprising two separate main parts, some parts being omitted for the sake of clarity, FIGS. 8–16 diagrammatically show the various positions of certain details of the device in FIG. 1 at different stages of a release operation.

As may be clearly seen from FIG. 7 which is a section on line 7—7 of FIG. 5, the relative movement of the lever parts 8a, 8b is restricted by pins 150 secured to the lever part 8a and projecting into recesses 151 in the upper edge of the prongs of the lever part 8b. In the position shown in FIGS. 1 and 7 the lever part 8a may via the pins 150 directly catch the lever part 8b and withdraw it in the direction of the pull forces on the lever part 8a, whereas it, in the opposite direction of movement, results in a lost motion relative lever part 8b which motion to its length corresponds to the size of the recess 151.

On the prongs 57 of one of the lever parts 8b is pivotally mounted a rocker arm 152 which by means of a spring (not shown) is held in the position shown in FIG. 7. In this position the upper end of the rocker arm rests against an abutment surface on the prong, whereas the lower edge of the rocker arm 152 registers with a guide surface 153 on the bottom surface of the prong. In the position shown in FIG. 7, the lower portion of the rocker arm 152, emerging into a nose, forms an extension of the guide surface 153.

A pivot 74 provided on the lever part 8a carries a pawl 75 and a bell crank 76. The pawl 75 normally engages the ratchet 70 and can then turn the ratchet in the brake applying direction of the brake lever, but not in the opposite direction.

The bell crank 76 serves to render possible disengagement of a second pawl 78 provided on the lever part 8b by means of the lever part 8a. The pawl 78 also cooperates with the ratchet 70 and effects locking of the hand brake through the intermediary of the above named pinions and toothed locking segments. The bell crank 76 is provided with a dog 79 which by cooperating with a stop surface on the lever part 8a limits the movement of the crank 76 in the direction corresponding to disengagement of the pawl 78.

The pawl 78 provided on the lever part 8b is pivotally mounted on a pivot 81 and is normally maintained in engagement with the wheel 70 by a helical compression spring 82 which abuts the bottom of a bore 83 in the lever part 8b. In engaged position the pawl 78 prevents the wheel 70 from turning relative to the lever part 8b.

The pawl 78 is on both sides of the dog provided with an arcuate arm 84, but these arms have different forms and are intended for obtaining mutually opposite results. Thus, one arm 84 of the pawl is provided to be actuated on its curved, outwardly facing surface by the bell crank 76 in order to move the pawl out of engagement with the wheel 70, whereas the other arm 84 is provided to be actuated on its hook like inside by one of the pivot pins 150 in order to move the pawl out of engagement with the wheel 70. As will be seen from FIG. 6, which is a section on the line 6—6 in FIG. 1, the pin 150 under consideration for this purpose is somewhat extended inwardly.

The free end 86 of the bell crank 76 is pivotally connected to one end 87 of a two-armed lever 88, the other end 89 of which is articulated to the push rod 91 for the push button 7, which push rod is loaded by a helical spring 90. The free end 92 of the pawl 75 is articulated to a point 93 located between the two outer pivots of the lever 88. The two pawls 75 and 78 can be disengaged together or individually by pressing in the push button 7. In order to enable the pawl 75 to move independently of the bell crank 76, this crank has a slot shaped hole at its outer free end 86 for connection to the lever 88. The compression spring 90 tends to retain the pawl 75 in engaged position and to keep the bell crank 76 out of contact with the arm 84 of the pawl 78.

Upon the swinging movement of the brake lever when releasing the brake, all the time a pressure force may be exerted on the push button 7, whereas the push button 7 need not be actuated at all when the brake is being applied.

In order to retain the pins 150 on the lever part 8a in engagement with the abutting surface in clockwise direction in the recess 151 on the lever part 8b, a helical tension spring 95 is provided between the pivot 56 and a bolt 96 on the lever part 8a above the pivot 59. The spring 95 tends to swing the lever part 8a in a clockwise direction relative to the lever part 8b.

MODE OF OPERATION

I. With pneumatic operation

APPLICATION

If the lever part 8a is moved upwards from the initial position shown in FIG. 1, it takes along with it the lever part 8b which through the intermediary of the links 66 in a conventional manner acts upon the valve device of the hand brake power amplifier. The lever parts 8a and 8b move together as a single unit, and the pinions 71 are rolling freely on the toothed locking segments 72. At the same time, the wheel 70 rotates in a direction such that the pawls 75 and 78 are sliding over the teeth of the wheel 70.

After the brake lever 8a, 8b has been pulled to the braking position which is defined by the existing brake clearance and the elasticity of the linkage, the lever part 8b is locked to the toothed segment 72 by means of the pawl 78, the wheel 70 and the pinion 71, the pointed end of the pawl 75 resting against the rear side of a locking tooth of the wheel 70 near the top of the tooth. Even in this position the spring 95 keeps the lever part 8a in the stopped position against the lever part 8b.

RELEASE

To release the brake the lever 8a, 8b is first pulled to such an extent as to relieve that pawl 78 which is operative at that time To this end the push button 7 can be pressed in order to lift the pawls 78 and 75 entirely out of engagement with the wheel 70 so that the brake can be released and the lever 8a, 8b can be returned to the releasing position, as previously described. The dog 79 limits the swinging movement of the pawl 78 upon lifting the same from the locking position, and an abutment 155 at the free end 92 of the pawl 75 limits the upward lifting movement of the pawl 75 by engaging an abutment on the lever part 8b. Both pawls 78 and 75 can perform a limited swinging movement only when they are lifted from the locking position. Otherwise, even if both pawls are relieved, it could happen that one of the pawls due to greater frictional forces or the like would be retained in the locking position, whereas the other pawl would swing away unnormally long as the push button 7 is pressed in. The above mentioned abutments ensure that the pawl which for some reason remains in engaged position will be disengaged under all conditions after the easily movable pawl has reached its stop position.

II. Without pneumatic operation

APPLICATION

The lever 8a, 8b is pulled as a single unit until the brake clearance at the brake shoes of the vehicle is completely taken up. During this operation the brake lever is directly connected to the bellows rod 44a, 44b. Since there is no servo force present, the lever cannot be pulled in a single stroke to the final braking position. However, the lever part 8b is retained in its actual locking position by means of the pawl 78. Now the lever part 8a (together with the handle) with the push button 7 released is swung downwardly toward the brake releasing position. Since at that time the lever part 8b is locked to the toothed segment 72, the pinions 71 and the wheel 70 are at a rest so that the pawl 75 can slide over some of the teeth of the locking wheel 70 and finally snap into engagement with the locking wheel 70 under the influence of the push button spring 90.

When the lever part 8a is moved again upwardly in the brake applying direction, the locking wheel 70 is turned in the brake applying direction. It is then to be noted that upon pulling the brake lever the dog 79 of the bell crank lever 76 is abutting its abutment surface on the lever part 8a so that the pawl 78 is not positively controlled but is only under the influence of its spring 82, and in a similar manner the pawl 75 is influenced by the push button spring 90. By swinging the outer lever part 8a, with the push button 7 released, forth and back between those end positions which are defined by the pins 150 and the recess 151, the wheel 70 may be fed step-wise in the clock-wise direction, the pinions 71 acting as planet wheels and travel upwardly on the toothed segments 72. Since the pinions 71 are mounted on the pivot 59 provided in the lever part 8b, this lever part, too, will be turned through a certain angle to a new locking position.

The pinions 71, toothed segments 72 and the two lever parts 8a, 8b form a change gear which renders possible a considerable increase of the force on the bellows rod 44a, 44b as compared with the manual force exerted on the lever part 8a. By repeated pulls on the lever part 8a full brake power, if needed, can be exerted on the vehicle wheels without pneumatic operation.

RELEASE

Figure 8:
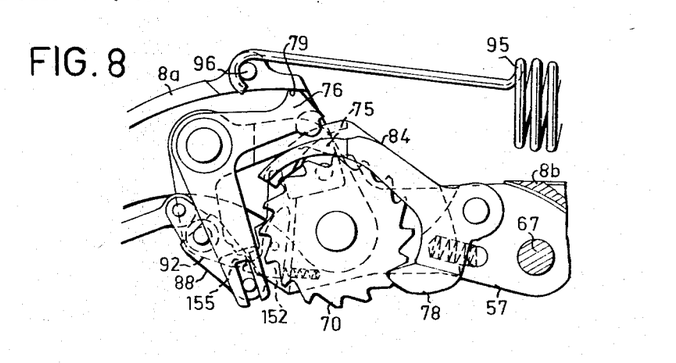

To release the brake without pneumatic operation, the lever part 8a is moved downwards and the parts relevant in this connection assume at a certain moment the positions according to FIG. 8. The pawl 75 is then ready to engage the locking wheel 70, and the abutment 155 at the free end 92 of the pawl 75 has been moved into contact with the end portion 154 of the rocker 152 and has turned the rocker through a small angle in the counter-clockwise direction.

Figure 9:
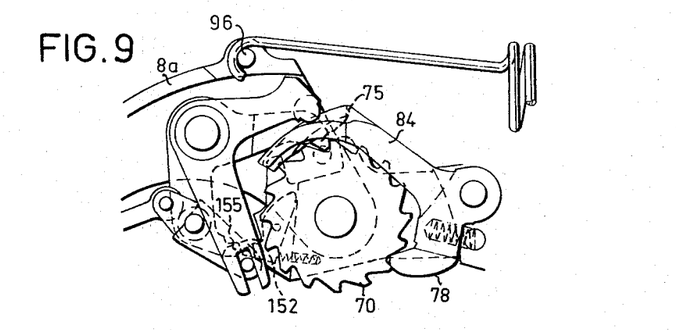

Upon continued downward movement of the lever part 8a the position according to FIG. 9 is obtained. Here, the pawl 75 has engaged the wheel 70, and the abutment 155 of the pawl has been swung away from the rocker 152 which consequently has returned to the position shown in FIG. 1 by means of its return spring. The pawl 78 is still loaded.

Figure 10:
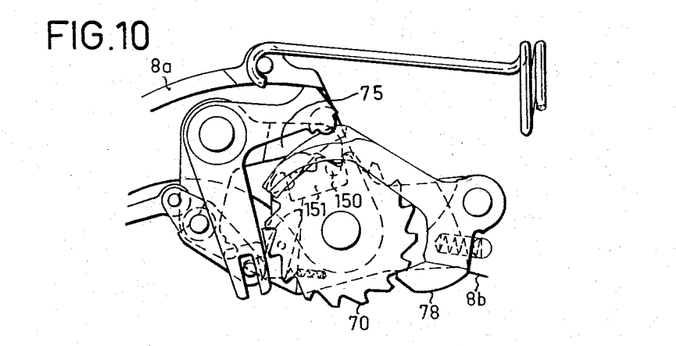

After the lever part 8a has reached the position according to FIG. 9 it is swung in the clockwise direction or lifted, and its pawl 75 takes over the load and turns the wheel 70 in the brake applying direction to the position according to FIG. 10. During this movement, the pins 150 have come into contact with the right-hand endwalls of the recess 151 so as to limit the swinging movement of the lever part 8a relative to the lever part 8b. At the same time, the pawl 78 has slid upwards on the rear side of a tooth of the wheel 70.

Figure 11:
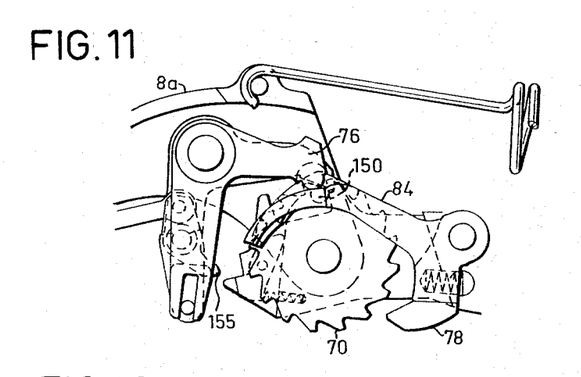

In the position shown in FIG. 10, the button 7 is pressed in resulting in the position according to FIG. 11. When the button is pressed in, the bell crank 76 is turned in the clockwise direction and acts upon the underlying arm 84 of the pawl 78 which will be entirely disengaged from the wheel 70. At the same time the other arm 84 of the pawl 78 is moved downwards so as to abut one of the pins 150 (the left one in FIG. 6).

Figure 12:
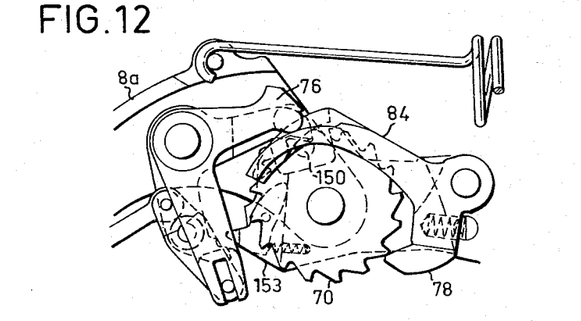

From the position according to FIG. 11 the lever part 8a is again moved downward resulting in that the wheel 70 is turned in the brake releasing direction. Under the cooperating action of the arms 84 of the pawl 78, the left pin 150 and the bell crank 76, the pawl 78 is positively guided to renewed engagement with the wheel 70. FIG. 12 illustrates an intermediate position during downward movement of the lever part 8a toward the position according to FIG. 13 in which the pawl 78 has been moved to its locking position.

Figure 13:
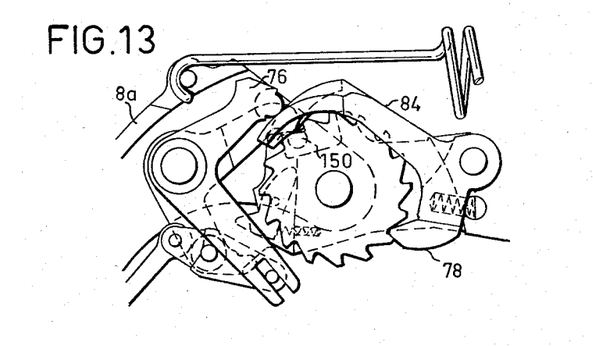

During the angular movement of the lever part 8a from the position according to FIG. 11 to the position according to FIG. 13 and the consequent counter-clockwise turning movement of the wheel 70 the pinions 71 have travelled somewhat downwards on the segments 72 so that the lever part 8b, too, has been moved in the brake releasing direction.

Figure 14:
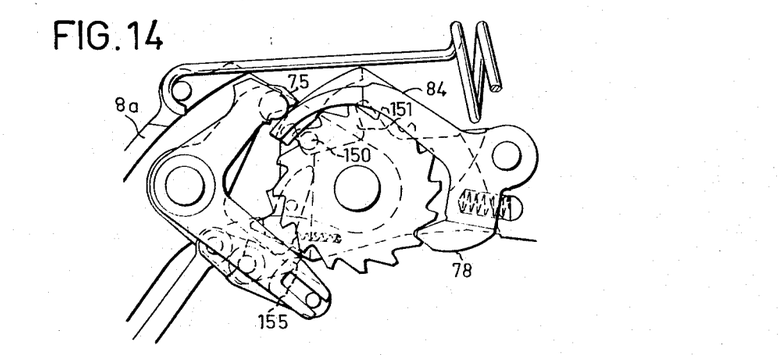

From the position according to FIG. 13 the lever part 8a is further swung down to the position according to FIG. 14 with the push button 7 still pressed inwards. In the last-named position the pawl 78 has again taken over the load and the pins 150 have engaged the opposite endwalls of the recess 151. Since the push button 7 has been kept under pressure inwards, the pawl 75 has been completely disengaged from the wheel 70, and its abutment 155 has been moved into engagement with the guide surface 153 of the lever part 8b. The bell crank 76 is prevented from clockwise movement due to its abutment on the cooperating arm 84 of the pawl 78.

Figure 15:
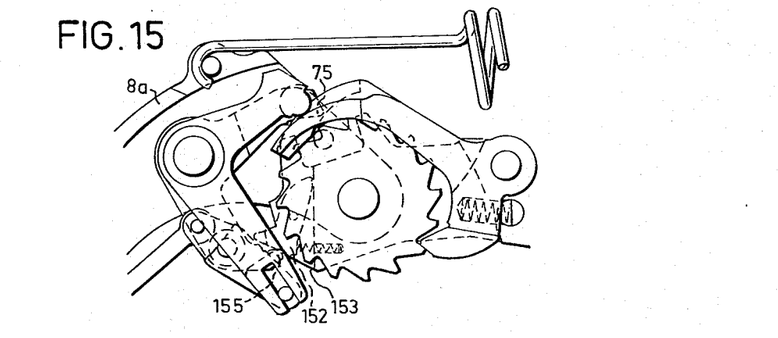

From the position according to FIG. 14 the lever part 8a is moved upwards as a result of which the abutment 155 of the pawl 75 slides along the guide surface 153 so that the pawl is turned clockwise toward the wheel 70. FIG. 15 illustrates an intermediate state of the movement, but in the position according to FIG. 16 the pawl 75 has completely engaged the wheel 70. It will be seen from FIG. 16 that the projecting abutment 155 during the last part of the inward movement of the pawl 75 is sliding on the extension of the guide surface 153 formed by the rocker 152.

Figure 16:
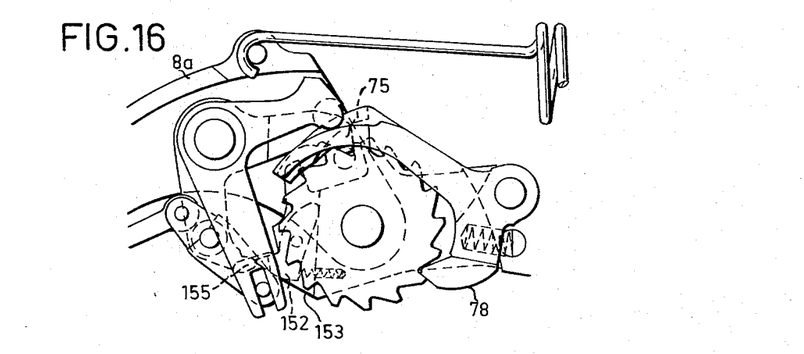

The position according to FIG. 16 corresponds to the position according to FIG. 9 except for the fact that in the last-named position the push button 7 is assumed not to be operated. If the lever part 8a is further moved upwards from the position according to FIG. 16 with the button 7 pressed in, the position according to FIG. 11 is obtained again whereupon the operation described with reference to FIGS. 11 to 16 is repeated until the tension on the brake linkage has been reduced to such an extent that the remaining releasing operation can be effected without the aid of the change gear.

This last-named step of the releasing operation is effected by moving the lever part 8a with pressed-in button 7 upwards from the position according to FIG. 11, the lever part 8b being carried along by the pins 150. During this operation the wheel 70 is slightly turned clockwise so as to relieve the pawl 75 which under the action of the force exerted on the push button 7 is disengaged from the wheel 70. Now, the wheel 70 is completely free and the lever part 8b can follow the lever part 8a during the following downward movement thereof, resulting in complete release of the brake.

From the above it may be understood that according to FIG. 1 the push button 7 will be kept pressed-in during the complete release operation. However, the button will then make a certain movement inwards and outwards upon the swinging movement of the lever part 8a forth and back. When applying the brake, however, it is not necessary to manually actuate the button 7.

The invention is not limited to the embodiment shown in the drawings but may be modified within the scope of the appended claims.

What we claim is:

1. Braking mechanism for a vehicle having a frame, which comprises
   a hand brake
   a hand brake amplifier in the form of a pressure fluid-operated servo-device,
   a manually operable multi-stroke device,
   a lever mechanism
   a locking device
   said amplifier and said multi-stroke device being mounted together on said frame, and
   a hand brake lever in direct association with said amplifier and with said multi-stroke device,
   said hand brake lever cooperating both with said lever mechanism and said locking device for locking said amplifier and said multi-stroke device in desired position.

2. The vehicle braking mechanism defined in claim 1, in which said amplifier comprises a valve casing enclosing a valve device for controlling the supply of pressure fluid to said amplifier, and in which a control rod connects said hand brake lever with said valve device, said control rod having a piston located in a cylinder and balanced by the fluid pressure in the valve casing in such manner that for applying the brake by means of the servo device a manual force on the brake lever is required which manual force is proportional to the desired brake force.

3. Braking mechanism as defined in claim 1, in which said multi-stroke device comprises a change gear which may be operated when the servo-device is out of function and brake force is needed, which change gear enables a complete application of the brake and also provides for a stepwise release of the brake.

4. Braking mechanism as defined in claim 3, in which said locking device comprises a pawl cooperating with a toothed locking wheel and is provided to be brought into and out of engagement with said wheel, and in that said locking wheel is non-rotatably connected with two pinions forming parts of the change gear and being in constant mesh with a toothed segment secured to the frame.

5. Braking mechanism as defined in claim 4, in which the hand brake lever is composed of an inner part and an outer part pivotally mounted relative one another, the inner part of the brake lever being pivotally mounted on the frame at the center of said toothed segment, said locking wheel being rotatably mounted on said inner part of the brake lever, said pinions and the pawl cooperating with the locking wheel, whereas said outer lever part is pivotally mounted on said inner lever part coaxially with respect to said locking wheel.

6. Braking mechanism as defined in claim 5, in which the locking wheel cooperates with a pawl carried by said outer lever part for establishing a one-way clutch which in the locked position of said inner lever part is provided to permit said outer lever to perform a relative rotation in the brake-releasing direction without actuating the locking wheel and which upon return rotation of said outer lever part in the brake-applying direction engages the locking wheel and drives the same, said pinions engaging the toothed segments at the same time driving said inner lever part, said servo-device being of the bellows type and having a bellows rod extending through the bellows so that said inner lever part and said bellows rod are moved together to a position of a higher and successively increasing brake force.

7. Braking mechanism as defined in claim 6, in which said inner lever part is provided with two recesses engaged by two pins which are rigidly secured to said outer lever part, said recesses and pins cooperating to limit the mutual pivotal movement of said lever parts.

8. Braking mechanism as defined in claim 7, in which one of said pins is extended and provided, upon the relative pivotal movement of the outer lever part when releasing the brake, to actuate an arm formed on the pawl so as to move the pawl into engagement with the locking wheel.

9. Braking mechanism as defined in claim 8, in which the outer lever part carries common control means for the two pawls so that they may be lifted from the locking position either separately or together when they are not subjected to pressure load.

10. Braking mechanism as defined in claim 9, in which means are provided for limiting the individual movements of the pawls when they are lifted from the locking positions.

11. Braking mechanism as defined in claim 10, in which manual release of the hand brake lever when applied is carried out successively by moving the outer lever part forth and back, the pawls then being provided to be alternately brought into engagement for locking the toothed wheel until the braking effect has been released.

12. Braking mechanism as defined in claim 11, in which the control means upon the release of the braking effect are all the time operated manually, whereas upon brake application no manual operation of the control means is needed.

13. Braking mechanism as defined in claim 12, in which a rocker arm is movably mounted on one of said lever parts and forms an extension of a guide surface formed on a prong of the lever part and in that the rocker arm upon brake release operation controls the engagement of the pawl with the locking wheel.

References Cited by the Examiner

UNITED STATES PATENTS 2,607,374   8/1952   Cahoon ______________ 74—625

FOREIGN PATENTS 612,972   1/1961   Canada.

FRED C. MATTERN, Jr., *Primary Examiner.*

MILTON KAUFMAN, *Examiner.*

W. S. RATLIFF, Jr., *Assistant Examiner.*